INVENTOR.
Samuel C. Carter

Dec. 18, 1945.  S. C. CARTER  2,391,126
VALVE
Filed Aug. 17, 1943  2 Sheets-Sheet 2

INVENTOR.
Samuel C. Carter
BY
Attorney

Patented Dec. 18, 1945

2,391,126

UNITED STATES PATENT OFFICE 2,391,126

VALVE

Samuel C. Carter, Los Angeles, Calif.

Application August 17, 1943, Serial No. 498,943

22 Claims. (Cl. 251—103)

This invention has to do with a valve of the type in which packing is employed to effect a fluid-tight seal, and it is a general object of the invention to provide a simple, practical and effective valve of this type.

Valves are generally constructed so that a metal to metal seat or seal is depended upon to make them tight. It is advantageous in many instances to use a packing to effect a seal. However, when this is done certain difficulties are experienced. For instance, the packing becomes dislodged and enters the fluid being handled by the valve. In the case of a plug valve if packing is used there is a marked tendency for the packing to be shaved or cut loose as the plug is operated. This not only consumes packing but results in packing being deposited in the fluid being handled by the valve, a feature most undesirable in the case of fluids that must be kept clean and free of foreign matter.

It is an object of my present invention to provide a plug valve embodying a unique construction for packing between the plug and body. The construction is such as to provide a narrow ring of packing around the fluid passage in a manner to provide an effective and efficient seal so that the valve is made tight by the packing rather than depending upon the metal to metal fit.

Another object of the invention is to provide a plug valve construction of the character mentioned which lends itself to simple production manufacture. The construction involves a minimum number of simple, easily made parts.

Another object of the present invention is to provide a valve construction of the character mentioned in which the movable part, say the plug, which ordinarily acts to cut the packing, is constructed so that it can be operated repeatedly without in any way disturbing the packing.

Another object of the invention is to provide a plug valve of the character mentioned involving numerous novel and effective features of construction and operation, all of which make the valve practical and convenient to use.

Figure 1:
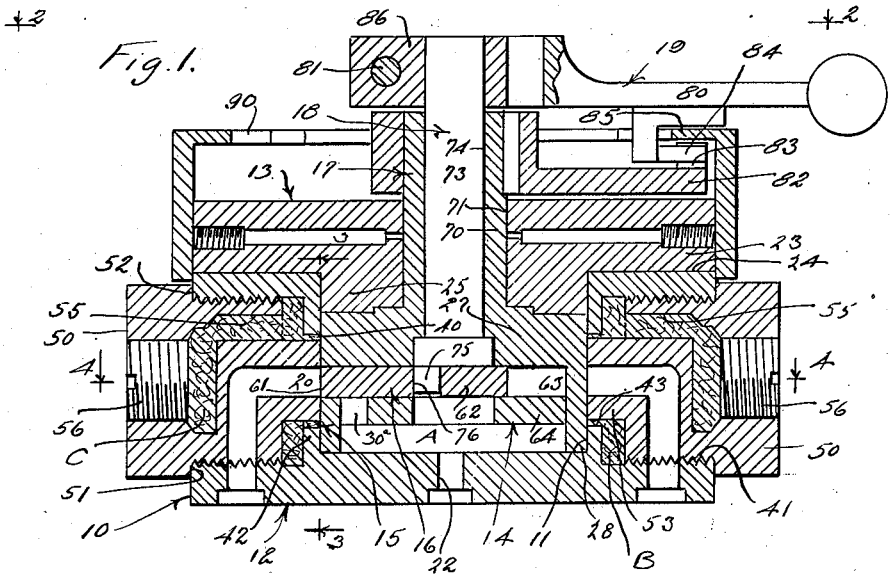
Figure 2:
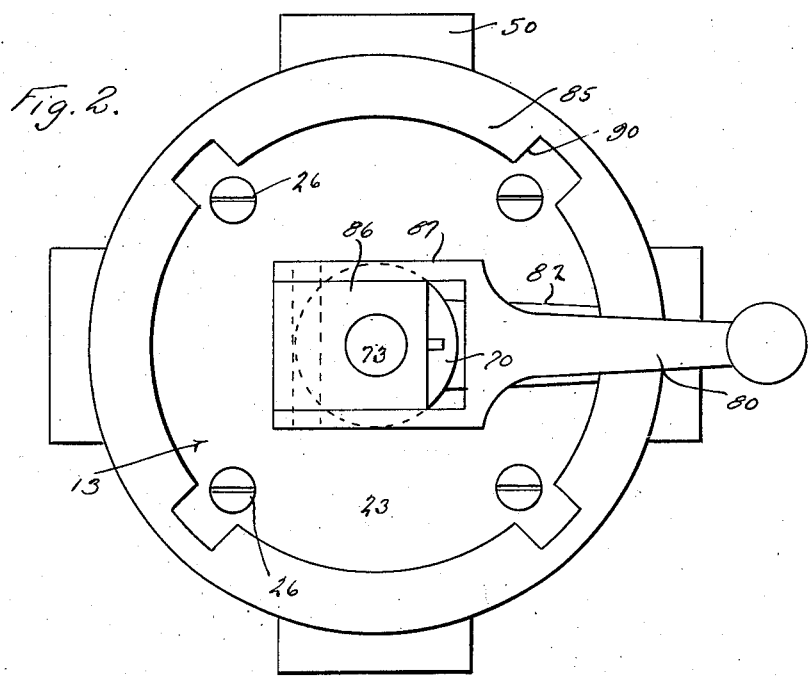
Figure 3:
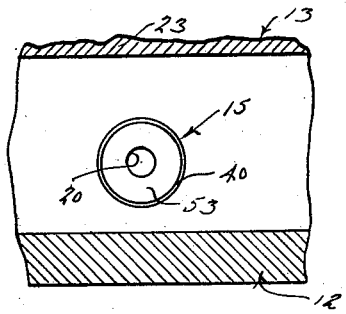
Figure 4:
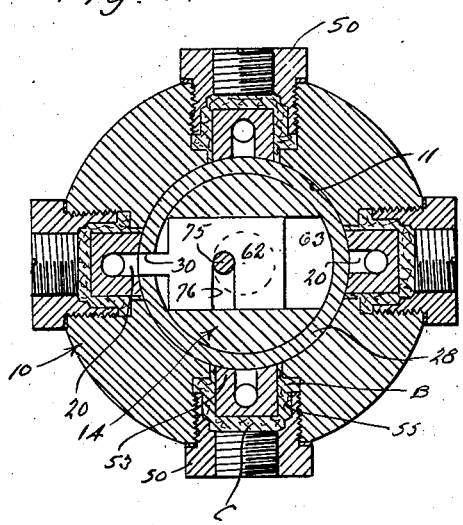
Figure 5:
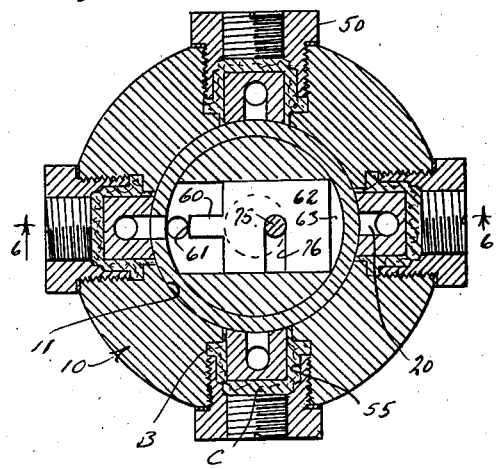
Figure 6:
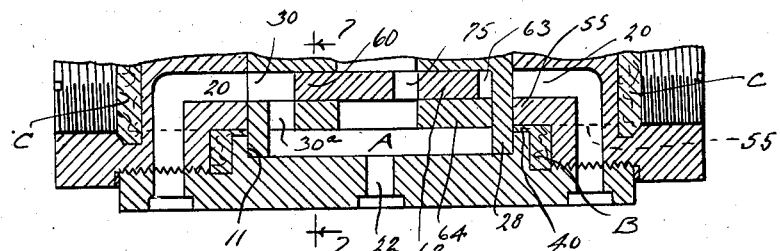
Figure 7:
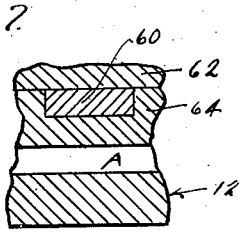

The various objects and features of my invention will be fully understood from the following detailed description of a typical preferred form and application of the invention, throughout which description reference is made to the accompanying drawings, in which:

Fig. 1 is a central section through a typical plug valve embodying the invention, showing the parts in position where the valve is ready to be finally opened to pass fluid through one outlet while the other outlet shown is closed or out of register. Fig. 2 is a plan view of the valve being a view taken as indicated by line 2—2 on Fig. 1. Fig. 3 is a detailed view showing a fluid port in the body of the valve and illustrating the packing ring surrounding the port, being a view taken substantially as indicated by line 3—3 on Fig. 1. Fig. 4 is a reduced transverse sectional view taken as indicated by line 4—4 on Fig. 1, showing the manner in which the parts are positioned when the valve plug is turned. Fig. 5 is a view similar to Fig. 4 showing the valve fully open. Fig. 6 is an enlarged view of a portion of the valve taken as indicated by line 6—6 on Fig. 5, and Fig. 7 is a detailed sectional view taken as indicated by line 7—7 on Fig. 6.

The features of valve construction provided by my invention are applicable to valves, generally, and may be incorporated in valves designed for various purposes. In the drawings I have shown one typical application of the invention but wish it understood that various modifications and adaptations may be made to fit the features of invention to other forms of valves, as circumstances may require. In the case illustrated the invention is applied to what may be termed a distributing valve, wherein there is a single fluid inlet and several fluid outlets, the valve being operable to conduct the fluid from the inlet to whichever one of the several outlets the operator may select.

The construction illustrated includes, generally, a valve body 10 having a cylindrical opening or bore 11, a head 12 closing one end of the body, a cap 13 closing the other end of the body, a plug 14 rotatably carried in the cylindrical chamber defined by the body cap and head and having a port for conducting fluid from said chamber to a port provided in the body, an annular packing 15 exposed to the chamber and surrounding a port in the body where it communicates with the bore 11, means 16 carried by the plug and operable to occupy the port provided therein so the plug presents a smooth continuous surface for operation in the body and past the packing, means 17 for operating the plug, means 18 for operating the means 16, and a single control 19 for operating the means 17 and 18.

The body 10, in accordance with the preferred form of the invention is shaped and proportioned to properly cooperate with the head 12 and cap 13 to form a closed chamber for carrying the plug 14. The body may vary in size and proportioning, depending upon the plug to be accommodated, and depending upon the number of fluid handling ports provided in it and upon the pressures or fluids to be handled. In the case illustrated the body is provided with four fluid handling ports, that is, the valve is such as to distribute or receive fluid to or from four different outlets. For sake of simplicity I will refer to but one outlet, it being understood that the construction may correspond at each of the outlets.

In accordance with my invention the body presents a smooth or finished cylindrical bore 11 to accommodate the plug 14, and communicating with this bore, at a suitable point circumferentially, there is a fluid handling port 20. This port extends radially a suitable distance from the bore 11 in the body and then extends axially to terminate or open at the end of the body which is provided with the head 12. A suitable fluid conduit may be connected with the body to communicate with the port 20. In the case illustrated there are four such ports 20 equally spaced around the body and the valve is such that these ports are in use one at a time, as will be hereinafter described.

The head 12 closing one end of the body 10 may, as shown in the drawings, be an integral or continuous part of the body. In practice the body may be formed of a block bored out from the cap end to form the chamber A so it is sufficiently deep to accommodate the parts hereinafter described.

The invention contemplates the introduction of the fluid to be handled into the chamber A of the body. In the preferred construction illustrated the fluid is introduced into the chamber A through an opening 22 provided in the head 12 and in practice a suitable supply pipe or the like can be connected in any suitable manner to deliver fluid to the opening 22.

The cap 13 which closes the other, or what I will term the upper, end of the body is a detachable or removable element in the form of a plate 23 designed to seat against the upper end 24 of the body and having a boss 25 turned to slidably extend a suitable distance into the upper end of the body opening. The boss 25 serves to define the upper end or wall of the chamber A and serves to centralize the cap relative to the body. In practice any suitable means may be provided for securing the cap 13 to the body 10, for instance, as shown, screws 26, or the like, may be provided to extend through the part 23 of the cap into the upper end of the body 10.

The movable element 14 of the valve, which is in the form of a plug, is rotatably carried in the chamber A formed by the combination of the body 10, head 12, and cap 13. The plug is formed of a disc-shaped body 27 which seats against the inner end of the hub 25 and a peripheral flange 28 which projects downwardly from the body 27 to slidably engage the head 12, as clearly shown in Figs. 1 and 6 of the drawings. The body 27 and flange 28 form an inverted cup-like structure which carries the parts hereinafter described and which serves to receive fluid introduced through the opening 22. A port 30 is formed through the flange 28 at a point so that it can be brought into register with the opening 20 by rotation of the plug. In the construction illustrated there is a single port 30 in the flange 28 as the valve is designed to pass the fluid to but one port 20 at a time.

The annular packing 15 surrounds the opening 20 to effect a seal around the opening to prevent escape or passage of fluid to or from the port 20 between the plug 14 and the wall 11 of the body opening. In accordance with my invention the packing 15 is in the form of a thin or narrow body of packing such as is shown in Fig. 3 of the drawings, it having been found that a thin body of packing of this kind is highly effective for the purpose. In practice I may use various forms or types of packing although it is preferred to employ a metallic or semi-metallic packing such as a mixture of lead, finely divided rubber or neoprene, or the like, and a suitable lubricant. It is to be understood, however, that the present invention is not concerned with the specific character of the packing used.

A feature of the present invention is the construction by which a narrow annular channel 40 is provided around the port 20 to carry the packing 15. In the construction illustrated a bore 41 is provided in the side of the body 10 concentric with the port 20 to extend into the body a substantial distance. A relatively thin wall 42 is left between the bottom of the bore 41 and the bore 11 of the body. An opening 43 considerably smaller in diameter than the bore 41 is provided through the wall 42 concentric with the port 20 to define the outer wall of the annular passage for carrying the packing 15.

A block 50 is screw threaded into the opening 41 until its shoulder 51 fits tightly against a shoulder 52 on the outer surface of the body 11. The block 50 has a central turned boss 53 which projects through the opening 43 with clearance sufficient to define the annular passage for the packing and so that the outer surface of the boss 53 forms the other wall of the packing passage. The main portion of the block 50 terminates short of the wall 52 so that a chamber B is formed around the boss 53 to carry a substantial body of packing which is in free communication with the packing which occupies the narrow annular passage.

An opening or chamber C is formed in the block 50 from its outer end to carry packing and packing-carrying ducts 55 are provided to pass packing from the chamber C to the chamber B. A plug 56 is screw-threaded into the outer end of the opening forming the chamber C. By rotating the plug 56 it can be forced against the packing in chamber C to force packing through passages 55, chamber B and out through the annular passage shown in Fig. 3.

In practice when the packing-carrying parts are filled with packing, as shown in the drawings, the plug 56 is tightened so that there is a pressure on the packing sufficient to cause it to tend to discharge from the narrow annular passage above described, and thereby maintain a tight seal between the plug 14 and the body 10.

The block 50 threaded into the opening 41 in the body becomes a rigid or fixed part of the body that is not disturbed after the structure is initially assembled. In the construction illustrated the port 20 provided in the body is actually formed in part through the block 50 and it will be observed from an examination of Figs. 1 and 6 that the port 20 is actually formed centrally in the boss 53 and extends laterally out through the block so that the fluid is finally discharged at the lower end of the body 10. In practice the several blocks 50 may be tightly assembled in place prior to finishing the bore 11 in the body so that one finishing operation causes the ends of the bosses to be turned true with the other parts of the body.

With the structure thus far described and with packing 15 in an annular body around the port 20 there would be a tendency for the packing to be cut or shaved off by the edges presented by the port 30 each time the valve was operated to move the port 30 past the packing.

The means 16 provided for occupying the port 30 operates to fill the port 30 so that there is no edge presented by the plug 14 to cut or in any way disturb the annular packing 15. The means 16 in its preferred form includes a filler 60 operable to fit and fully occupy the port 30 and having its outer end 61 curved concentric with the exterior of the plug 14 so that when the filler occupies the port 30 the surface 61 forms a continuation of the exterior of the plug.

In the form of the invention illustrated the filler 60 is formed on a cross-head 62 slidably carried in a guideway 63 formed in the plug 14. In the preferred construction the guideway 63 is provided by a slot formed in a disc-shaped part 64 of the plug which is formed separate from the other parts of the plug and is inserted from the bottom of the plug so it fits tightly in the flange 28, as clearly shown in Figs. 1 and 6 of the drawings. Since the plug part 64 is in the form of a disc and fits tightly in the flange from its lower end, a port 30ª is provided in the part 64 to pass fluid to the port 30 so that there is free flow of fluid from the opening 22 to the port 30.

The means 17 provided by the present invention for operating the plug 14 includes a stem 70 projecting upwardly from the plug 14 through a central bore 71 in the cap 13. The stem 70 projects above the cap where it may be engaged for rotation. In the form of the invention illustrated the stem 70 is formed integrally with the plug 14.

The means 18 provided for operating the means 16 includes a shaft 73 rotatably carried in a central bore 74 in the stem 70 and an eccentric pin 75 on the lower end of the shaft 73 cooperating with the crosshead 62. In the particular construction illustrated the eccentric pin 75 slidably fits a transverse channel 76 in the crosshead 62 so that as the shaft 73 is rotated through 180° the cross-head 62 is moved from one extreme position to the other in the guideway 63. At one end of its movement the cross-head 62 supports the filler 60 so that it occupies the port 30, as shown in Figs. 1 and 4, whereas at the other end of its movement it supports the filler 60 clear of the ports 30 and 30ª, as shown in Fig. 5.

The upper end of the shaft 73 projects above or beyond the stem 70 to be engaged for rotation.

The control means 19 for the means 17 and the means 18 is provided to facilitate operation of the plug 14 and of the means 16 through the stem 70 and the shaft 73, and further operates to coordinate the movements or operations of the plug 14 and the means 16 so that the plug 14 can only be turned when the means 16 is operated so that the filler 60 fully occupies the port 60 in the plug.

The control 19, as illustrated in the drawings includes generally a manually operable lever 80 pivotally connected to the projecting end of the shaft 73 through a transverse pivotal connection formed by a pivot pin 81, an arm 82 on the stem 70 provided with an upwardly opening notch 83, a finger 84 on the lever 80 to cooperate with the notch 83, and a retainer 85 operating to retain the finger 84 in the notch 83 throughout certain rotative positions of the plug 14.

The lever 80 may be an ordinary hand lever shaped and proportioned to facilitate convenient operation. The pivot pin 81 which carries the lever 80 is supported by a head 86 fixed on the projecting end of shaft 73. In the particular case illustrated the lever 80 has a yoke portion 87 which straddles the head 86 and receives the end portions of the pin 81 projecting from opposite sides of the head 86.

Through the construction just described the lever 80 can be swung vertically about the transverse pivot pin 81 without in any way disturbing or operating the shaft 73. However, when the lever 80 is turned or swung in either direction it will result in corresponding rotation of the shaft 73. It is through this structure that the lever 80 can be rotated to turn the shaft 73 and thus operate the eccentric pin 75 to shift the crosshead 64 between the two positions above described.

The arm 82 projects laterally from the projecting end portion of the stem 70 and is keyed or otherwise fixed to the stem to be rigid therewith. The notch 83 in the outer end portion of the arm 82 opens upwardly.

The finger 84 fixed to or carried by the lever 80 projects horizontally at a suitable distance below the lever 80 and is adapted to fit or engage in the notch 83 to provide a driving connection or lock between the lever 80 and the arm 82 so that when the lever 80 is operated or swung the arm 82 is correspondingly operated. The finger 84 is movable into and out of engagement with the notch 83 by operation of the lever 80 about the pin 81. It will be apparent from the drawings that if the lever 80 is lifted from a position such as is shown in Fig. 1 the finger 84 can be disengaged from the notch 83.

The retainer 85 is provided to prevent disengagement of the finger 84 from the notch 83 except when the plug 14 is in certain definite rotative positions relative to the body, in which positions the port 30 of the plug registers with a port 20 of the body. The retainer 85 is in the form of a flange carried by the cap 13 and overhanging the notched portion of the arm 82. It is clearly shown in Fig. 1 how the retaining flange 85 confines the finger 84 to the notch 83 so that when the parts are in the positions shown in Fig. 1 the stem 70 and shaft 83 are locked together to rotate in unison or as a unit. The retaining flange 85 has spaced channels 90 which allow for vertical passage of the finger 84 so that it will pass upwardly out of the notch 83. Where there are several ports 20 in the body 10 there is a corresponding number of channels 90 in the retaining flange 85 and the channels are so located as to pass the finger 84 only when the plug 14 is in a position where its port 30 registers with one of the ports 20 of the body. When the plug is thus positioned with its port 30 registering with a port 20 of the body the finger 84 can be disengaged from the notch 83 by lifting of the lever 81 so that the finger passes above the retaining flange 85, whereupon the lever can be operated to turn the shaft 73 independently of the stem 70 to operate the crosshead 62 and thus withdraw the filler 60 from the port 30. When the lever 80 has thus operated to independently move the shaft 73 to a position midway between two adjacent channels 90 the filler 60 is fully withdrawn or is in the position shown in Fig. 4. The parts are related so that whenever the finger 84 is in register with a channel 90 the filler 60 is fully projected into the opening 30.

Through the construction just described, whenever the finger 84 is disengaged from the notch 83 to be above the retaining flange 85 the plug 14 is left with its port 30 in register with a port 20 and rotation or swinging of the lever 80 operates the means 16 to move the filler 60 into and out of position where it occupies the port 30. However, whenever the lever 80 is in position where the finger 84 registers with a channel 90 the filler 60 is projected to occupy the port 30 and thus whenever the finger 84 engages the notch 84 so that the plug can be turned the plug and the means 16 turn as a unit without independent operation of the means 16 or, in other words, the plug turns with the filler 60 projected so that the plug has a continuous smooth external surface that operates past the annular packing 15.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. A valve including a body forming a chamber and having a port communicating with the chamber, a plug operable in the chamber and having a port to cooperate with the port of the body, packing carried by the body to seal between the body and plug, and means operable to occupy the port in the plug so the plug presents a continuous surface to operate past the packing.

2. A valve including a body forming a chamber and having a port communicating with the chamber, a plug operable in the chamber and having a port to cooperate with the port of the body, packing carried by the body in an annular body surrounding the port of the body to seal between the body and plug, and means operable to occupy the port in the plug so the plug presents a continuous surface to operate past the packing.

3. A valve including two elements, one a body forming a chamber and having a port communicating with the chamber, the other a plug operable in the chamber and having a port cooperating with the port of the body, packing carried by one element to pack between the body and plug, and a member carried by the other element operable to occupy the port therein so said other element presents a continuous surface to operate past the packing.

4. A valve including two elements, one a body forming a chamber and having a port communicating with the chamber, the other a plug operable in the chamber and having a port cooperating with the port of the body, packing carried by one element to pack between the body and plug, a member carried by the other element operable to occupy the port therein so said other element presents a continuous surface to operate past the packing, and means for operating the plug and cooperating with said member whereby the plug is operable only when said member occupies the port.

5. A valve including two elements, one a body forming a chamber and having a port communicating with the chamber, the other a plug operable in the chamber and having a port cooperating with the port of the body, packing carried by one element to pack between the body and plug, a member carried by the other element operable to occupy the port therein so said other element presents a continuous surface to operate past the packing, and a control operable to move said member only when the ports are cooperating and to move the plug only when said member is operated to occupy the port.

6. A valve including two elements, one a body forming a chamber and having a port communicating with the chamber, the other a plug operable in the chamber and having a port cooperating with the port of the body, packing carried by one element to pack between the body and plug, a member carried by the other element operable to occupy the port therein so said other element presents a continuous surface to operate past the packing, and a control operable to move said member only when the ports are cooperating and to move the plug only when said member is operated to occupy the port, the control including a single manually operable part.

7. A valve including two elements, one a body forming a chamber and having a port communicating with the chamber, the other a plug operable in the chamber and having a port cooperating with the port of the body, packing carried by one element to pack between the body and plug, a member carried by the other element operable to occupy the port therein so said other element presents a continuous surface to operate past the packing, and a control operable to move said member only when the ports are cooperating and to move the plug only when said member is operated to occupy the port, the control including a single lever associated with said member to operate it, an arm associated with the plug to operate it, and means releasably connecting the lever and arm to be operated together from the lever when said member is operated to occupy the port.

8. A valve including a body forming a cylindrical chamber and having circumferentially spaced ports communicating with the chamber, a plug rotatable in the chamber and having a port adapted to register with any one of the ports in the body, packing means for sealing between the body and plug around each of the ports in the body, and a member operable to occupy the port in the plug when the plug is moved.

9. A valve including a body forming a chamber having a port communicating with the chamber, a plug operable in the chamber and having a port to cooperate with the port in the body, and means for occupying the port in the plug so the plug has a continuous surface to operate in the body, said means including a part slidably carried by the plug and a filler projecting from said part to enter the port in the plug.

10. A valve including a body forming a chamber having a port communicating with the chamber, a plug operable in the chamber and having a port to cooperate with the port in the body, a tubular operating stem for the plug, a slide carried by the plug with a part to occupy the port in the plug, and a shaft carried in the stem operable to move the slide.

11. A valve including a body forming a chamber having a port communicating with the chamber, a plug operable in the chamber and having a port to cooperate with the port in the body, a tubular operating stem for the plug, a slide carried by the plug with a part to occupy the port in the plug, a shaft carried by the stem operable independently thereof, and an eccentric pin on the shaft engaging the slide to move it when the shaft is rotated.

12. A valve including a body having an opening and a port communicating with the opening, a plug carried in the body opening, a stem for operating the plug, a packing carried by the body to surround the port, the plug having a port to cooperate with the port in the body, a member carried by the plug operable to occupy the port in the plug, a shaft carried by the stem, an eccentric pin on the shaft for operating said member, and a single operating means for the stem and shaft.

13. A valve including a body having an opening and a port communicating with the opening, a plug carried in the body opening, a stem for operating the plug, a packing carried by the body to surround the port, the plug having a port to cooperate with the port in the body, a member carried by the plug operable to occupy the port in the plug, a shaft carried by the stem, an eccentric pin on the shaft for operating said member, an operating lever carried by the shaft, an arm on the stem, and means under control of the lever whereby the plug is operable by the lever through the stem only when the shaft is in position so said member occupies the port in the plug.

14. A valve including, a body forming a chamber and having an opening joining the chamber, a block having a fluid passage opening at one end thereof, the block being applied to the body so its inner end forms part of the wall of the chamber and so there is an opening between the block and body surrounding the block at the chamber, packing in the last named opening, and a plug in the body engaged by the packing and operable to control the fluid passage.

15. A valve including a body forming a chamber and having a side opening communicating with the chamber, a block occupying the side opening and having its inner end in the plane of the wall of the chamber and spaced from the inner end of the side opening to form a channel, packing in the channel, the block having a fluid passage opening at its inner end, and a plug operable in the chamber to be sealed by the packing and to control the fluid passage.

16. A valve including a body forming a chamber and having a side opening communicating with the chamber, a block screw threaded into the side opening and having its inner end in the plane of the wall of the chamber and spaced from the inner end of the side opening to form a channel, packing in the channel, the block having a fluid passage opening at its inner end, and a plug operable in the chamber to be sealed by the packing and to control the fluid passage.

17. A valve including a body forming a chamber and having a side opening communicating with the chamber and enlarged at its outer end, a block occupying the side opening being threaded in the said outer end thereof and having its inner end in the plane of the wall of the chamber and spaced from the inner end of the side opening to form a channel, packing in the channel, the block having a fluid passage opening at its inner end, and a plug operable in the chamber to be sealed by the packing and to control the fluid passage.

18. A valve including a body forming a chamber and having a side opening communicating with the chamber, a block occupying the side opening and having its inner end in the plane of the wall of the chamber and spaced from the inner end of the side opening to form a channel, packing in the channel, the block having a fluid passage opening at its inner end, and a plug operable in the chamber to be sealed by the packing and to control the fluid passage, there being a cavity established in the side opening by the block to carry a supply of packing.

19. A valve including a body forming a chamber and having a side opening communicating with the chamber and enlarged at its outer end, a block occupying the side opening being threaded in the said outer end thereof and having its inner end in the plane of the wall of the chamber and spaced from the inner end of the side opening to form a channel, packing in the channel, the block having a fluid passage opening at its inner end, and a plug operable in the chamber to be sealed by the packing and to control the fluid passage, there being an unoccupied cavity in the enlarged part of the side opening forming a chamber to carry packing in communication with the said channel.

20. A valve including a body forming a chamber and having a side opening communicating with the chamber, a block occupying the side opening and having its inner end in the plane of the wall of the chamber and spaced from the inner end of the side opening to form a channel, packing in the channel, the block having a fluid passage opening at its inner end, and a plug operable in the chamber to be sealed by the packing and to control the fluid passage, there being a cavity established in the side opening by the block to carry a supply of packing, the block including a threaded part operable to apply pressure on packing in the cavity.

21. A valve including a body forming a chamber and having a side opening communicating with the chamber, a block occupying the side opening and having its inner end in the plane of the wall of the chamber and spaced from the inner end of the side opening to form a channel, packing in the channel, the block having a fluid passage opening at its inner end, and a plug operable in the chamber to be sealed by the packing and to control the fluid passage, there being a cavity established in the side opening by the block to carry a supply of packing, the block including a threaded part accessible from the outer end of the block and operable to apply pressure on packing in the cavity.

22. A valve including, a body forming a chamber and having an opening in it from one side communicating with the chamber and enlarged at its outer end portion, a block threaded in the outer end portion of the opening and having its inner end coplanar with the wall of the chamber and reduced in size leaving a channel between it and the wall of the opening in the body, there being a fluid passage extending between the inner end of the block and one side of the block remote from the inner end, there being a cavity in the block communicating with the channel, packing in the cavity and channel, a plug in the body to be sealed by the packing and to control the fluid passage, and a member carried by the block operable to apply pressure to the packing in the cavity.

SAMUEL C. CARTER.